United States Patent
Qi et al.

(10) Patent No.: US 7,613,436 B2
(45) Date of Patent: Nov. 3, 2009

(54) METHODS AND APPARATUS FOR A PROTECTED PAGING INDICATION MECHANISM WITHIN WIRELESS NETWORKS INCLUDING MULTIPLE ACCESS POINTS

(75) Inventors: Emily H. Qi, Portland, OR (US);
JR-Shian Tsai, Beaverton, OR (US);
Jesse R. Walker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 11/435,267

(22) Filed: May 15, 2006

(65) Prior Publication Data

US 2007/0264954 A1 Nov. 15, 2007

(51) Int. Cl.
*H04B 1/18* (2006.01)
(52) U.S. Cl. .............. 455/186.1; 455/426.1; 455/458; 455/502; 370/331; 370/313; 370/312; 370/349
(58) Field of Classification Search .............. 455/186.1, 455/458, 518; 155/502; 370/313, 329
See application file for complete search history.

(56) References Cited

U.S. PATENT DOCUMENTS

| | | | |
|---|---|---|---|
| 2004/0229605 A1 | 11/2004 | Hwang et al. | |
| 2004/0258008 A1 | 12/2004 | Inoue et al. | |
| 2005/0007995 A1 | 1/2005 | Inoue et al. | |
| 2005/0111395 A1* | 5/2005 | Hwang et al. | 370/313 |
| 2005/0232200 A1* | 10/2005 | Jeong et al. | 370/331 |
| 2007/0087767 A1* | 4/2007 | Pareek et al. | 455/502 |
| 2007/0254677 A1* | 11/2007 | Venkitaraman et al. | 455/458 |

FOREIGN PATENT DOCUMENTS

WO 2004/114703 A1 12/2004

OTHER PUBLICATIONS

International Search Report mailed on Oct. 19, 2007 for International Application No. PCT/US2007/068771, 6 pgs.

* cited by examiner

*Primary Examiner*—David Q Nguyen
(74) *Attorney, Agent, or Firm*—Schwabe, Williamson & Wyatt, P.C.

(57) ABSTRACT

Embodiments of the present invention provide methods and apparatus for a protected paging indication mechanism within wireless networks including multiple access points. Other embodiments may be described and claimed.

24 Claims, 6 Drawing Sheets

METHODS AND APPARATUS FOR A PROTECTED PAGING INDICATION MECHANISM WITHIN WIRELESS NETWORKS INCLUDING MULTIPLE ACCESS POINTS

TECHNICAL FIELD

Embodiments of the present invention relate to the field of wireless networks, and more particularly, to a protected paging indication mechanism within wireless networks including multiple access points.

BACKGROUND

The power saving mode for mobile devices defined by standards developed by special interest groups and/or standard development organizations, for example, the Institute of Electrical and Electronic Engineers (IEEE) is generally defined for operation within networks that include a single Access Point (AP) of coverage, meaning that this power saving mode does not work in the case of coverage in networks that include more than one AP. Re-association is needed across different APs and the power saving mode is designed for an active system in a low power operation mode, and not for a standby system. When mobile users carrying a mobile device travel from one AP to another AP, the mobile device will roam from one AP to another AP. Therefore, mobile devices conduct basic service set transition (BSS), or extended service set transition (ESS), even though there isn't any upcoming/outgoing traffic to/from a particular mobile device. In general, BSS transition involves scanning the available channels for the target AP, selecting the best AP, and re-association to a new AP. This unnecessary BSS transition may disrupt the total system idle, as well as unnecessary power consumption for doing re-association and scanning.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide methods and apparatus for a paging mechanism for a wireless network including multiple access points.

Figure 1:
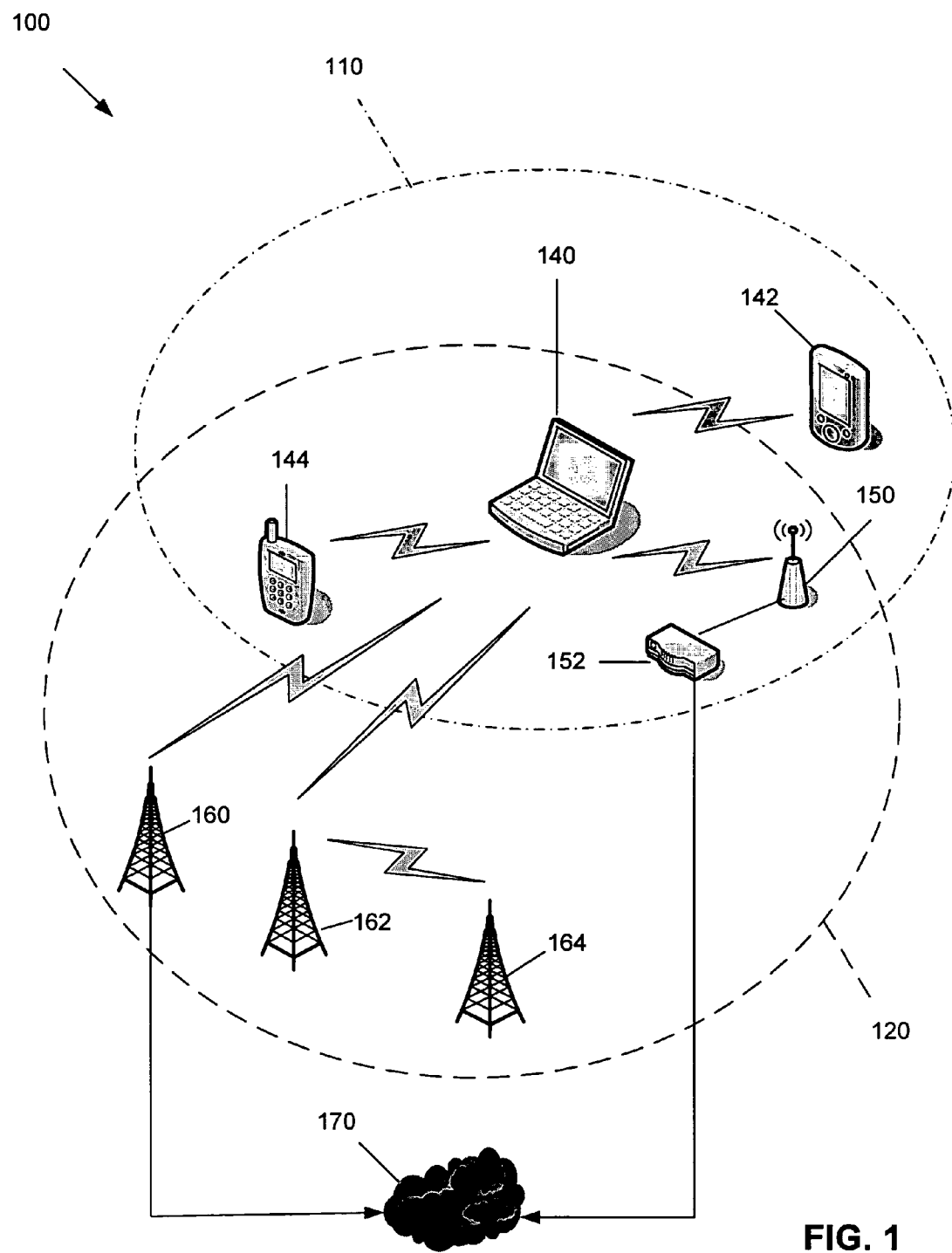
FIG. 1 is a schematic diagram representation of an example wireless communication system in accordance with various embodiments of the present invention.

Referring to FIG. 1, an example wireless communication system 100 may include one or more wireless communication networks, generally shown as 110 and 120. In particular, the wireless communication system 100 may include a wireless local area network (WLAN) 110, and a wireless metropolitan area network (WMAN) 120. Although FIG. 1 depicts two wireless communication networks, the wireless communication system 100 may include additional or fewer wireless communication networks. For example, the wireless communication network 100 may include more or less WLANs, and/or WMANs. The methods and apparatus described herein are not limited in this regard.

The wireless communication system 100 may also include one or more mobile devices, also referred to as subscriber stations, generally shown as 140, 142 and 144. For example, the subscriber stations 140, 142 and 144 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a global positioning satellite (GPS) device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts three subscriber stations, the wireless communication system 100 may include more or less subscriber stations.

The subscriber stations 140, 142 and 144 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links.

In one example, the laptop computer 140 may use direct sequence spread spectrum (DSSS) modulation and/or frequency hopping spread spectrum (FHSS) modulation to implement the WLAN 110 (e.g., modulations in accordance with any one of the 802.11 family of standards developed by the Institute of Electrical and Electronic Engineers (IEEE) and/or variations and evolutions of these standards). For example, the laptop computer 140 may communicate with devices associated with the WLAN 110 such as the handheld computer 142 and/or the smart phone 144 via wireless links. The laptop computer 140 may also communicate with an access point (AP) 150 via a wireless link. Generally, WLANs and WMANs include multiple APs 150. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 120. For example, the laptop computer 140 may operate in accordance with the 802.16 family of standards developed by IEEE to provide for fixed, portable, and/or mobile broadband wireless access (BWA) networks (e.g., the IEEE std. 802.16, published by IEEE 2004) to communicate with base stations, generally shown as 160, 162, and 164, via wireless link(s).

Although some of the above examples are described with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 110 and WMAN 120 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 110 may be operatively coupled to the common public or private network 170 via an AP 150 and/or the router 152. In another example, the WMAN 120 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards. Although FIG. 1 depicts a WLAN, and a WMAN, the wireless communication system 100 may include other combinations of WLANs, WMANs, and/or WWANs. The methods and apparatus described herein are not limited in this regard.

The wireless communication system 100 may include other WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
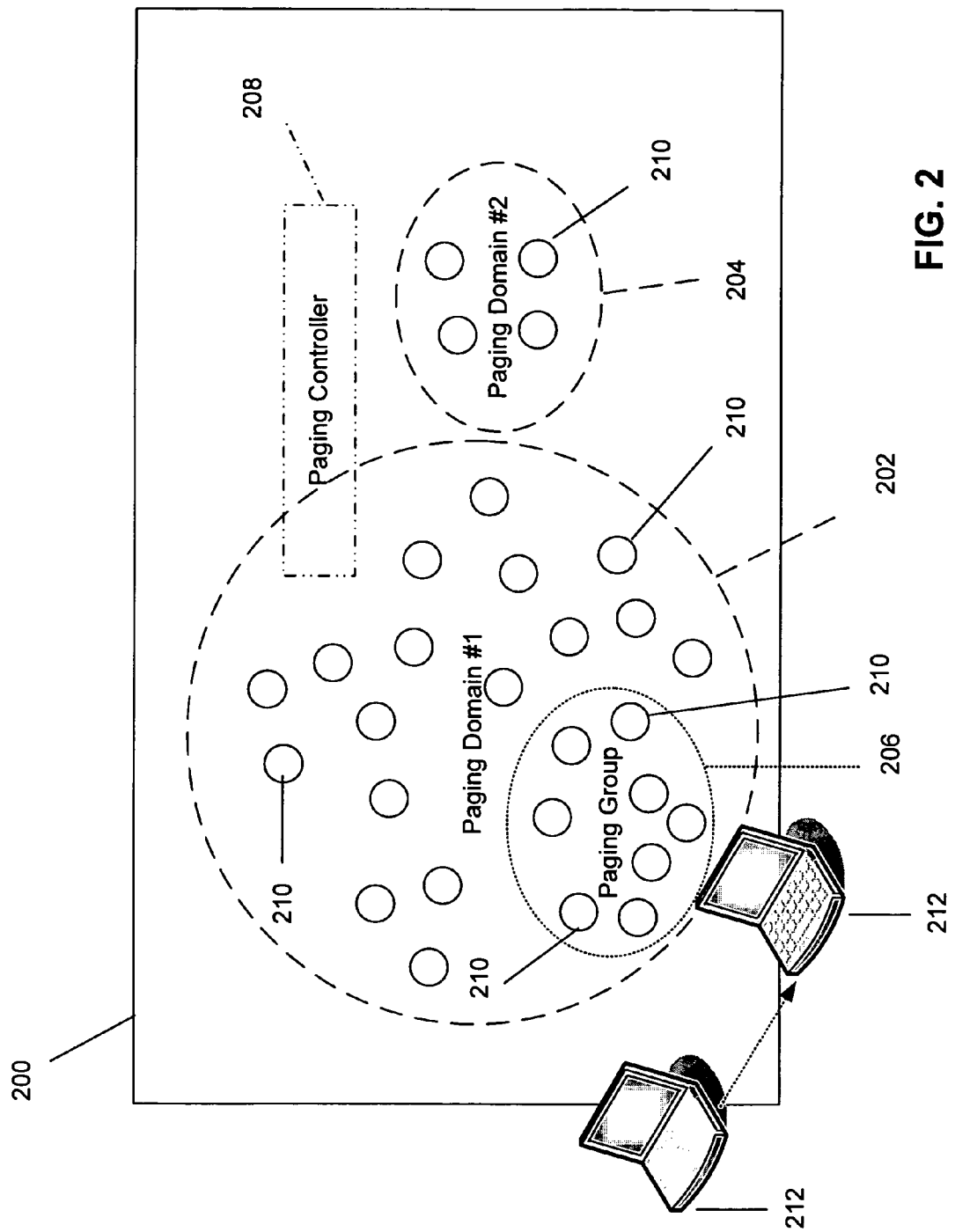
FIG. 2 is a schematic diagram representation of a paging architecture for a wireless network including multiple access points in accordance with various embodiments of the present invention.

Referring to FIG. 2, a paging architecture for a network 200 in accordance with various embodiments of the present invention is schematically illustrated. The paging architecture includes, for example, a first paging domain 202, a second paging domain 204, a paging group 206, and a paging controller 208.

The paging domain comprises one or more APs 210. The paging domain has a unique paging domain identification (ID), thereby allowing an STA 212 to identify the paging domain with which it is associated.

The paging group is within the paging domain and includes a list of APs that are near the STA. In one exemplary embodiment of the present invention, the paging group is the same as the Neighbor Report defined in IEEE 802.11K (2004). A paging group may overlap multiple paging domains such that it is within one or more paging domain.

The paging controller is responsible for managing paging functionality such as location updates, and for responding to paging requests and/or broadcasting paging messages. The paging controller maybe co-located with a location server (such as GPS) and/or a wireless router that is capable of buffering incoming packets and configuring a paging message from the paging controller.

An access point and STA each comprise an omnidirectional antenna, a control block, a transmit block operatively coupled to the control block and antenna, and a receive block operatively coupled to the control block and antenna. At least the transmit block and receive block may be part of a transceiver having at least one common component. Within at least the STA, the transmit and receive blocks comprise components implementing a medium access control (MAC) layer and a Physical (PHY) layer of a communication model. The STA may enter and exit a paging mode by the control block powering at least some or all of the components implementing the MAC and/or PHY layers off and on.

Generally, a station (STA) within the network enters a paging mode. The STA temporarily or partially "awakens" prior to a paging interval (advertised or otherwise made known e.g. by a paging controller) during which paging indication messages (PIM) are broadcast, and is ready for being paged by the paging controller when there is incoming packets.

Figure 3:
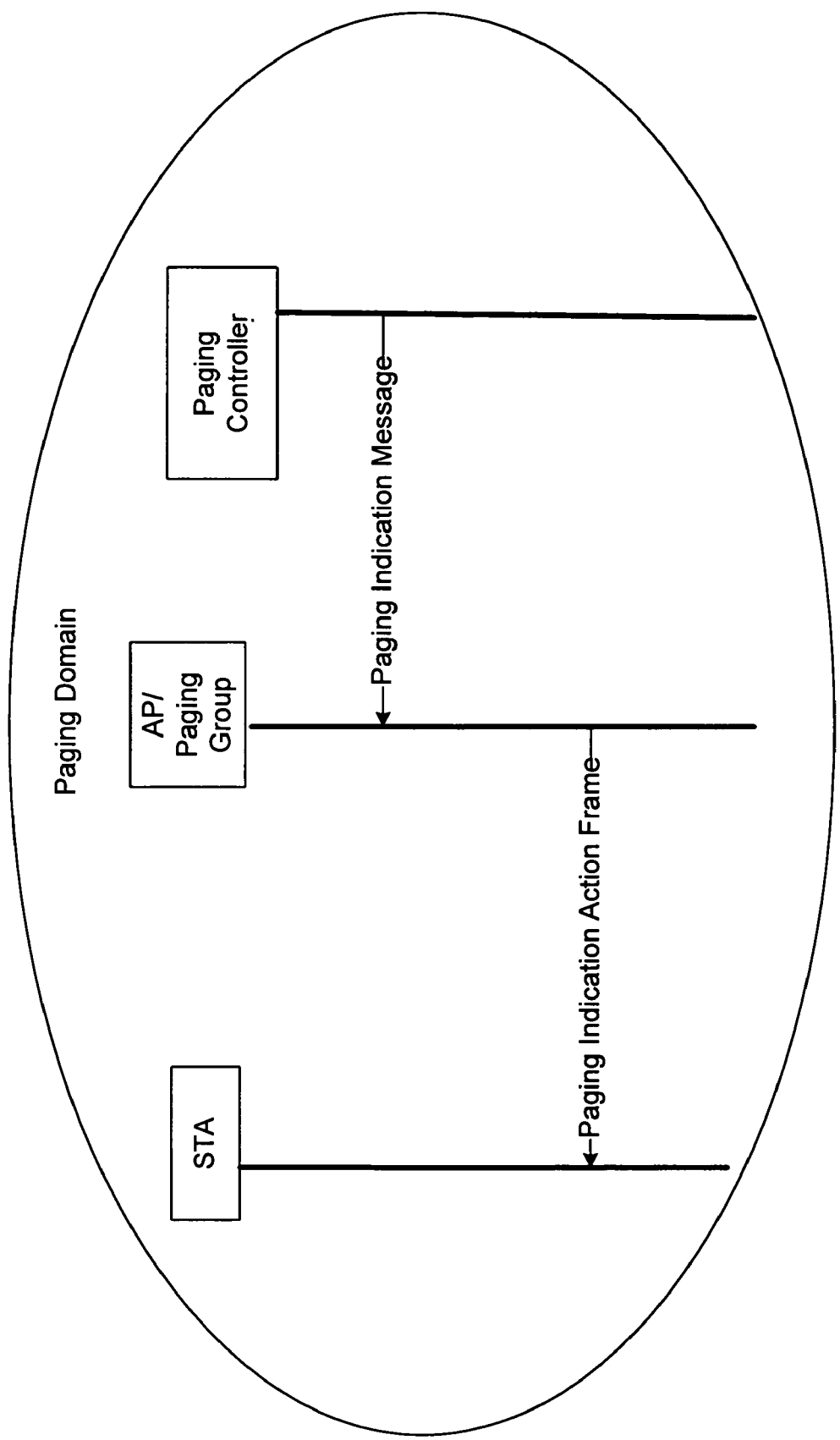
FIG. 3 is a schematic diagram representation for an example of message and action frame flow within a paging architecture for a wireless network including multiple access points in accordance with various embodiments of the present invention.
Figure 4:
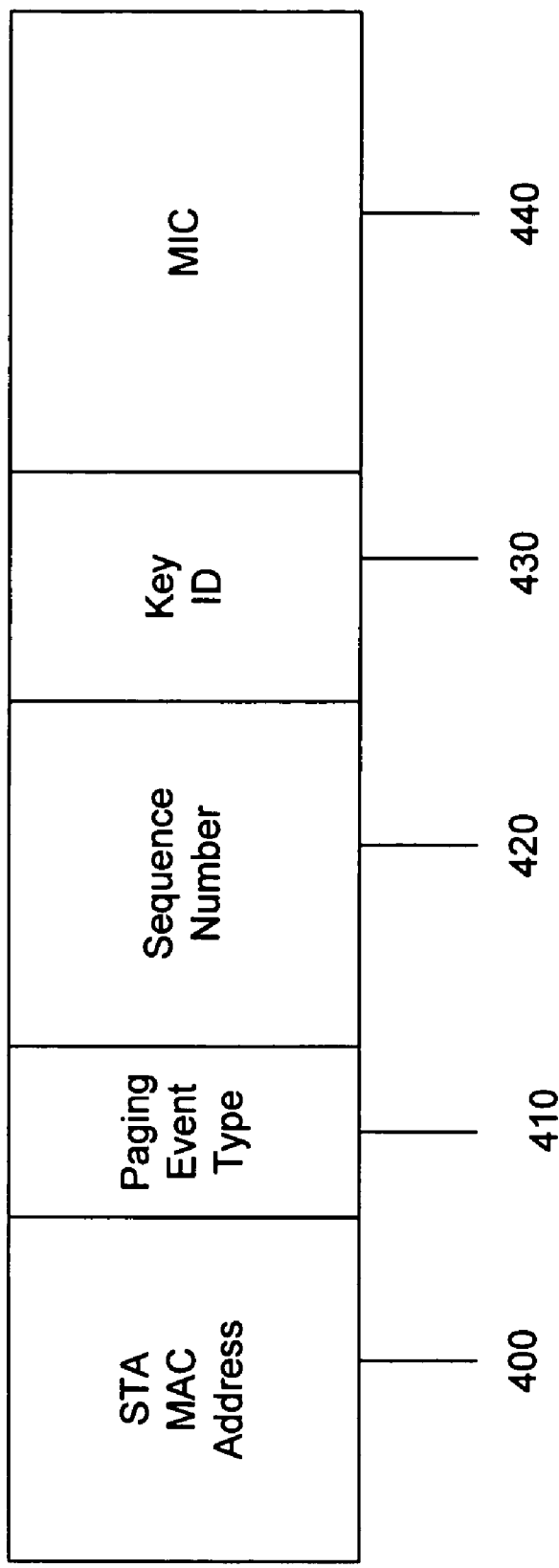
FIG. 4 is a schematic diagram representation of an exemplary format for a protected paging information subelement in accordance with various embodiments of the present invention.

Referring to FIGS. 3 and 4, an example of PIMs and the message exchange flow, in accordance with various embodiments of the present invention, may be described. PIMs are sent to an AP or a set of APs within a paging group during each paging interval. PIMs are made up of protected paging information subelements (protected paging ISE).

FIG. 4 illustrates an exemplary format for a protected paging ISE in accordance with various embodiments of the present invention. As may be seen the protected paging information ISE includes a field 400 for a STA MAC address, which indicates the STA for which the paging controller is looking. The format also includes a field 410 for a paging event type, which indicates the paging type. The paging type may be, for example, voice over internet protocol (VoIP), video conference, or others. A sequence number field 420 is also included in the format, which enables replay protection. A key identification (ID) field 430 is also included in the format and identifies an integrity pairwise temporal key (IPTK) between the paging controller and STA used to compute a message integrity code (MIC) for a MIC field 440. The MIC field includes the MIC.

In an exemplary embodiment, field 400 has a size of six octets (48 bits), field 410 has a size of one octet (8 bits), and field 420 has a size of six octets (48 bits). The key ID field 430 has a size of two octets (16 octets). In this exemplary embodiment, bits 0-11 define a value in a range of 0-4095, bits 12-15 are reserved and set to 0 upon transmission and are ignored upon receipt. The MIC field 440 has a size of 8 octets (64 bits) and includes a message integrity code calculated over all of the preceding fields. Examples of MICs include those based on an advanced encryption standard (AES) in cipher-based message authentication code (CMAC) mode and those based on a secure hash algorithm (SHA-1) in keyed hash method authentication code (HMAC) mode.

The paging controller transmits PIMs made up of the protected paging ISEs to the APs during each paging interval. If the paging controller is able to confirm the location of a STA for which a PIM is intended, then the paging controller may multicast the PIM to the appropriate paging group. Otherwise, the PIMs are broadcast within the paging domain.

In addition to the protected paging ISEs, each PIM includes a randomization interval. The randomization interval is used by the APs as will be described in more detail herein.

In accordance with various aspects of the present invention, when an AP receives a PIM, the AP composes a paging indication action frame. The paging indication action frame is made up of paging information elements (paging IE). In an exemplary embodiment, the paging indication action frame is a class 1 action frame. Each paging IE is made up of one or more protected paging ISEs.

In an exemplary embodiment in accordance with the present invention, the AP transmits the paging indication action frame after a random delay. The random delay is determined in accordance with (e.g. bounded by) the randomization interval, which is specified in units of IEEE 802.11 time units. If a paging IE only includes one protected paging ISE, the AP may transmit the paging indication action frame as a unicast frame. Otherwise, the paging indication action frame is broadcast by the AP as a broadcast frame.

Once an STA enters the paging mode, the STA may temporarily or partially exit the paging mode prior to each paging interval, or prior to a paging interval after more than one paging interval has passed, to receive paging indication action frames. The exit may be automatic or may be triggered by a user. The STA checks the paging indication action frames from the AP(s), if any, and the STA examines each frame. If a paging indication action frame is a unicast frame, the STA checks the destination address to determine if the STA has been or is being paged. If the paging indication action frame is a broadcast frame, the STA will interpret the entire frame to determine if the STA has been or is being paged. If the STA has not been paged, it may re-enter the paging mode.

Figure 5:
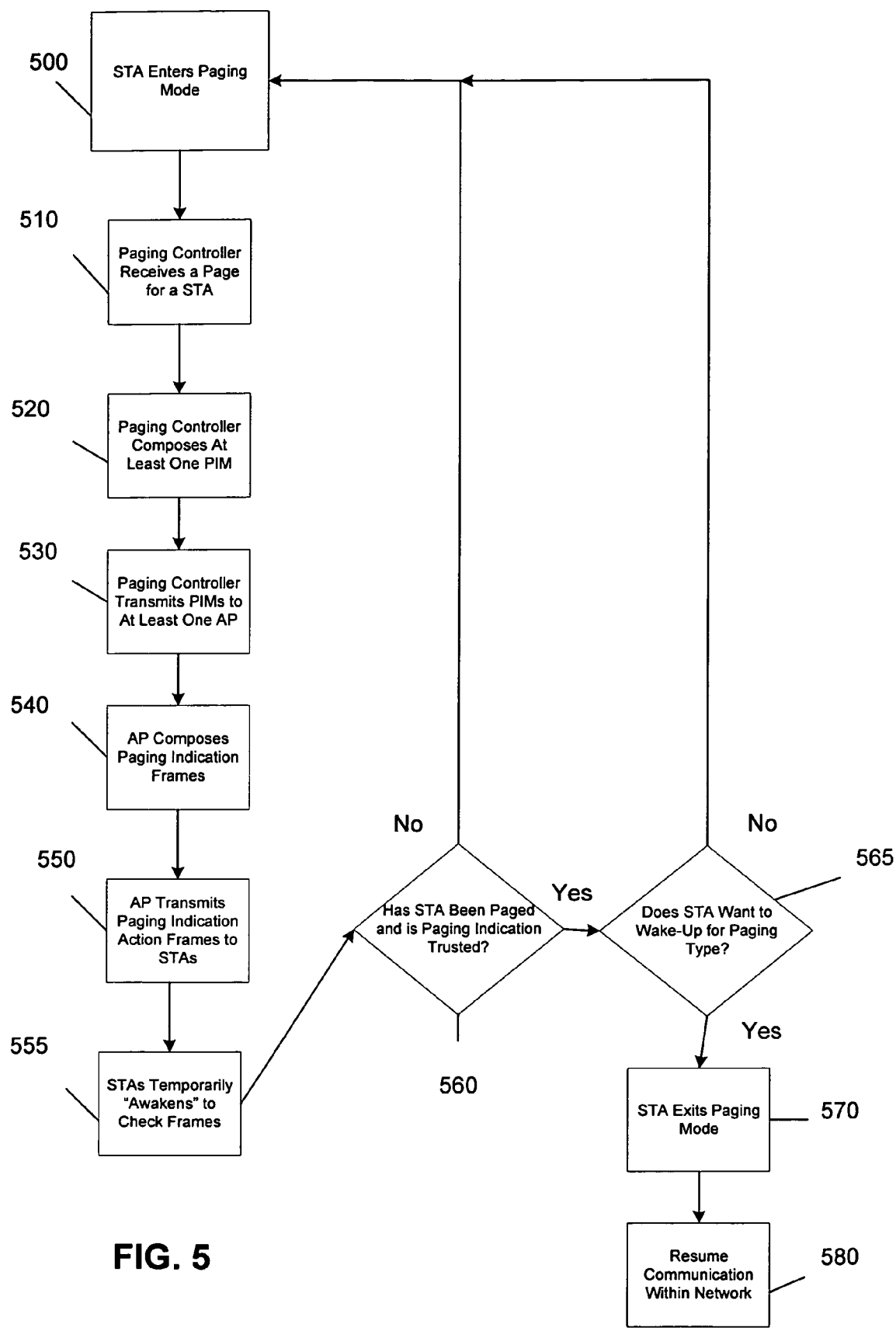
FIG. 5 is a flowchart illustrating an example of operation of a protected paging indication mechanism for a wireless network including multiple access points in accordance with various embodiments of the present invention.

Thus, with reference to FIG. 5, an exemplary operation for a paging mechanism, in accordance with various embodiments of the present invention, may include, at block 500, a STA entering a paging mode and at block 510, a paging controller receiving a page for a STA. At block 520, the paging controller composes at least one PIM made up of one or more protected paging ISEs and includes a randomization interval. At block 530, the paging controller transmits PIMs during a paging interval to at least one AP. At block 540, APs compose paging indication action frames made up of paging IEs, which are made up of the protected paging ISEs. The APs transmit the paging indication action frames during the paging interval at block 550 after a random delay bounded by the randomization interval. At block 555, the STA temporarily or partially "awakens" to check paging indication action frames. At block 560, the STA checks the paging indication action frame to see if it has been paged and if the paging indication is trusted. As noted at blocks 565-580, if the STA has been paged and the paging indication is trusted, the STA checks the paging event type and decides whether or not to fully "wake-up" to exit the paging mode and resume communication within the network. If none of these conditions are met, the STA may re-enter the paging mode.

Figure 6:
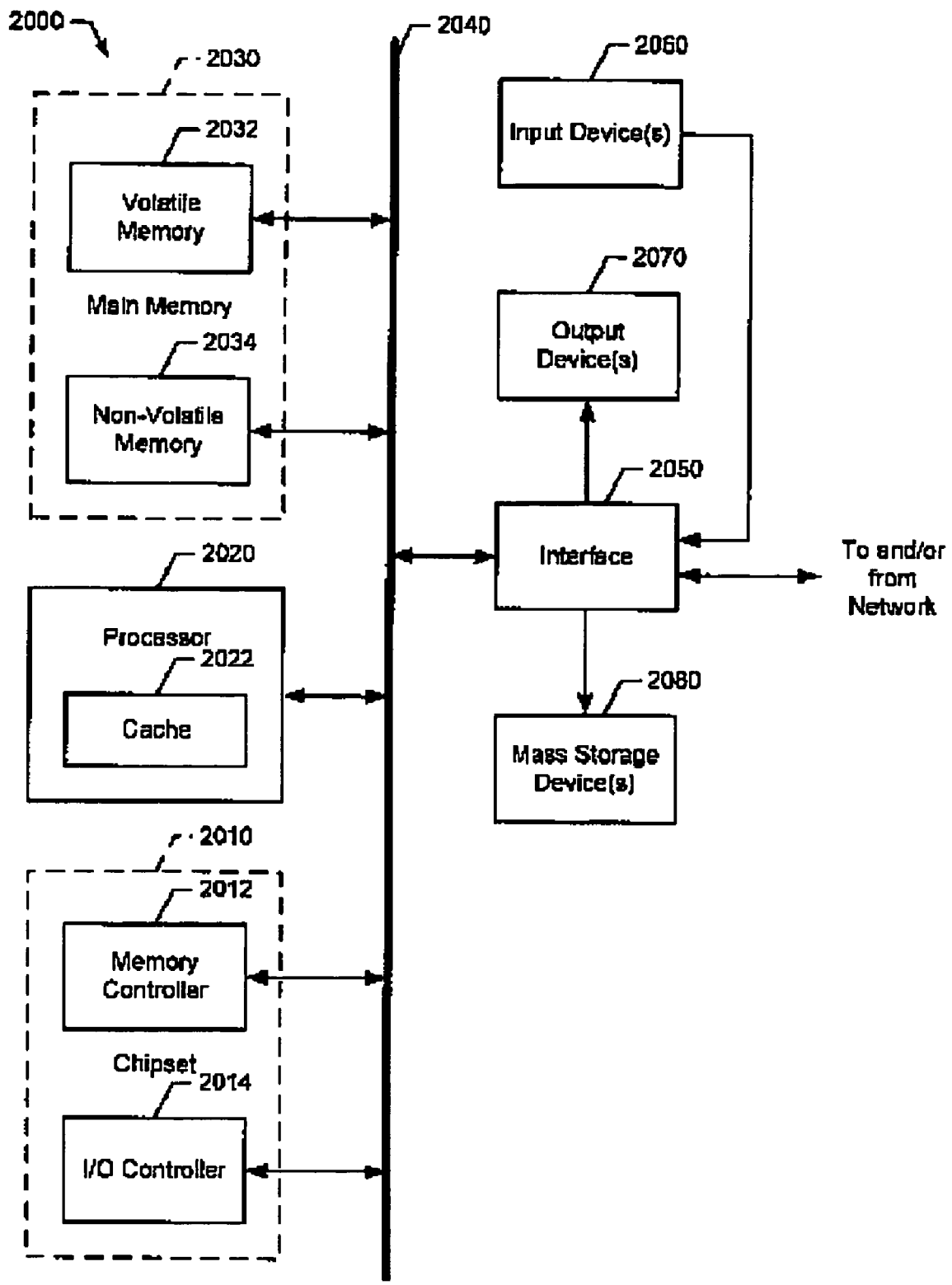
FIG. 6 is a block diagram representation of an example processor system that may be used to practice various aspects of the present invention.

FIG. 6 is a block diagram of an example processor system 2000 adapted to implement the methods and apparatus disclosed herein, in accordance with various embodiments. The processor system 2000 may be a desktop computer, a laptop computer, a handheld computer, a tablet computer, a PDA, a server, an Internet appliance, and/or any other type of computing device. The processor system 2000 may be used as a STA, an AP, or a server hosting the paging controller function.

The processor system 2000 illustrated in FIG. 6 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The chipset 2010 may be implemented using one or more Wireless Personal Area Network (WPAN) components, Wireless Local Area Network (WLAN) components, Wireless Metropolitan Area Network (WMAN) components, Wireless Wide Area Network (WWAN) components, and/or other suitable networking components. In particular, in various embodiments designed to be a STA or an AP, the chipset 2010 may be endowed with the teachings of the present invention, implementing selected aspects of the above described paging mechanism. The processor 2020 may be implemented using one or more processors, e.g. those of the Intel® Core™ technology, Intel® Pentium® technology, the Intel® Itanium® technology, the Intel® Centrino™ technology, the Intel® Core™ Duo technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device. In various embodiments designed to be used as a server, suitable for hosting the above described paging controller function, main memory 2030 may include (a non-persistent copy of the) instructions implementing all or portions of the above described paging controller function.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface. In various embodiments designed to be a STA or AP, selected aspects of the above described paging mechanism may be implemented in interface circuit 2050, in addition to or in lieu of the endowment in chipset 2010.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives. In various embodiments designed to be used as a server, suitable for hosting the above described paging controller function, mass storage device(s) may include (a non-persistent copy of the) instructions implementing all or portions of the above described paging controller function.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
receiving, from a paging controller within a network comprising a plurality of access points arranged into at least one paging domain that each include at least one access point, a paging indication message (PIM) that includes at least one protected paging subelement (Protected Paging ISE) constructed by the paging controller to protectively and correspondingly page at least one station (STA) associated with one of the at least one paging domain, the PIM further including a randomization interval;
composing a paging indication action frame that includes at least one paging information element that includes at least one Protected Paging ISE; and
transmitting the paging indication action frame to the at least one STA, the transmitting comprising transmitting the paging indication action frame after a random delay based at least in part on the randomization interval.

2. The method of claim 1, wherein the PIM comprises a plurality of Protected Paging ISEs to page a plurality of STAs associated with the at least one paging domain, said composing comprises composing the paging indication action frame with a plurality of paging information elements comprising the Protected Paging ISEs, and said transmitting comprises broadcasting the paging indication action frame to the STAs being paged.

3. The method of claim 1, wherein the PIM comprises a single Protected Paging ISE to page a STA associated with the at least one paging domain, said composing comprises composing the paging indication action frame with one paging information element comprising the single Protected Paging ISE, and said transmitting comprises unicasting the paging information action frame to the STA being paged.

4. The method of claim 1, wherein said receiving comprises receiving the PIM through a multicast by the paging controller.

5. The method of claim 1, wherein said receiving comprises receiving the PIM through a broadcast by the paging controller.

6. The method of claim 1, wherein a PIM is received during a paging interval defined by the paging controller.

7. The method of claim 1, wherein each Protected Paging ISE comprises a paging event type.

8. The method of claim 7, wherein each Protected Paging ISE further comprises a station address, a sequence number field, a key identification field and a message integrity code.

9. An apparatus comprising:
a receive block adapted to receive, for a station (STA) hosting the apparatus, a paging indication action frame from at least one access point within a network comprising a plurality of access points, the paging indication action frame including at least one paging information element (Paging IF) that comprises one or more protected paging information subelements (Protected Paging ISE), the protected paging ISEs being generated at a paging controller within the network to page STAs within the network, each Protected Paging ISE comprising a station address, a sequence number field, paging event type, a key identification field and a message integrity code; and
a control block operatively coupled to the receive block and adapted to interpret the paging indication action frame to determine if the STA is being paged.

10. The apparatus of claim 9, wherein the control block is adapted to interpret a destination address of a unicast paging indication action frame to determine if the STA is being paged.

11. The apparatus of claim 9, wherein the control block is adapted to interpret an entire broadcast paging indication action frame to determine if the STA is being paged.

12. The apparatus of claim 9, wherein the control block is adapted to interpret a paging event within the Protected Paging ISE to determine whether to exit a paging mode and resume communication within the network.

13. The apparatus of claim 9, wherein the control block is adapted to verify a message integrity code within the Protected Paging ISE to determine whether the PIM is trustworthy and to determine whether to exit a paging mode and resume communication within the network.

14. The apparatus of claim 9, wherein the control block is adapted to verify a sequence number within the Protected Paging ISE to determine whether the PIM is replayed, and to determine whether to exit a paging mode and resume communication within the network.

15. A system comprising:
an omnidirectional antenna; and
a paging controller operatively coupled to the antenna to control paging of stations (STA) within one or more paging domains, each paging domain having a plurality of access points (AP) through which the paging controller communicates with the STA, the paging controller being adapted to compose a paging indication message (PIM) comprising at least one protected paging indication subelement (Protected Paging ISE) for paging at least one of the STAs, the paging controller being further adapted to transmit the PIM to at least one AP;
wherein the paging controller composes the PIM to include a randomization interval.

16. The system of claim 15, wherein each Protected Paging ISE comprises a STA address, a paging event type, a sequence number field, a key identification field and a message integrity code.

17. The system of claim 15, wherein the PIM is transmitted as a multicast.

18. The system of claim 15, wherein the PIM is transmitted as a broadcast.

19. A method comprising:
receiving, from a paging controller within a network comprising a plurality of access points arranged into at least one paging domain that each include at least one access point, a paging indication message (PIM) that includes at least one protected paging subelement (Protected Paging ISE) constructed by the paging controller to protectively and correspondingly page at least one station (STA) associated with one of the at least one paging domain;
composing a paging indication action frame that includes at least one paging information element that includes at least one Protected Paging ISE; and
transmitting the paging indication action frame to the at least one STA;
wherein each Protected Paging ISE comprises a paging event type, a station address, a sequence number field, a key identification field and a message integrity code.

20. The method of claim 19, wherein the PIM comprises a plurality of Protected Paging ISEs to page a plurality of STAs associated with the at least one paging domain, said composing comprises composing the paging indication action frame with a plurality of paging information elements comprising the Protected Paging ISFs, and said transmitting comprises broadcasting the paging indication action frame to the STAs being paged.

21. The method of claim 19, wherein the PIM comprises a single Protected Paging ISE to page a STA associated with the at least one paging domain, said composing comprises composing the paging indication action frame with one paging information element comprising the single Protected Paging ISE, and said transmitting comprises unicasting the paging information action frame to the STA being paged.

22. The method of claim 19, wherein said receiving comprises receiving the PIM through a multicast by the paging controller.

23. The method of claim 19, wherein said receiving comprises receiving the PIM through a broadcast by the paging controller.

24. The method of claim 19, wherein a PIM is received during a paging interval defined by the paging controller.

* * * * *

UNITED STATES PATENT AND TRADEMARK OFFICE
CERTIFICATE OF CORRECTION

PATENT NO. : 7,613,436 B2
APPLICATION NO. : 11/435267
DATED : November 3, 2009
INVENTOR(S) : Qi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 776 days.

Signed and Sealed this

Nineteenth Day of October, 2010

David J. Kappos
*Director of the United States Patent and Trademark Office*